United States Patent Office 2,918,439
Patented Dec. 22, 1959

2,918,439

RESINS FROM BIS(2,3-EPOXY-CYCLOPENTYL) ETHER

Benjamin Phillips and Paul S. Starcher, Charleston, and Charles W. McGary, Jr., and Charles T. Patrick, Jr., South Charleston, W. Va., assignors to Union Carbide Corporation, a corporation of New York No Drawing. Application December 20, 1956
Serial No. 629,473

26 Claims. (Cl. 260—2)

This invention relates to curable compositions and resinous compositions made therefrom. More particularly, this invention is directed to amine-epoxide compositions which are useful in the synthetic resins art for adhesives, protective coatings, castings, laminates, films and the like, and to processes for their preparation.

Our resinous compositions can be obtained as hard, tough, solid resins, semi-solid resins and viscous, liquid resins from mixtures containing bis(2,3-epoxycyclopentyl) ether and polyfunctional amines. Our solid resins can be made as infusible materials with high heat distortion values and capable of supporting loads of up to 264 pounds per square inch at temperatures as high as 180° C. to 200° C., and above. Resins having high room temperature flexural strengths, of over 22,000 pounds per square inch, and high room temperature compressive strengths, of the order of 46,200 pounds per square inch and higher, can be made in accordance with our invention. Moreover, such resins have high flexural strengths at elevated temperatures, for example, over 11,000 pounds per square inch at 150° C. and over 9,000 pounds per square inch at 175° C. These resins are suitable for a variety of applications, for example, wherein strength and load carrying capabilities at elevated temperatures, in addition to hardness and toughness, are required. Our solid resins can also be made with high degrees of hardness and are particularly valuable as durable, wear-resistant and scratch-resistant materials. They can be made as transparent solids, colored solids, and as solids which are capable of being machined and polished. Anion exchange properties are other characteristics of resins which can be made by our invention. Insolubility in most organic solvents is another property that is characteristic of the resins of our invention.

Our semi-solid and viscous liquid resins can be made so as to contain reactive epoxy groups or reactive amino hydrogens. Semi-solid or viscous liquid resins containing reactive epoxy groups are obtainable having plasticizing and stabilizing properties for chlorine containing polymers, e.g., polyvinyl chloride and chlorinated rubbers. These epoxy-containing resins also are reactive with active hydrogen compounds, such as, polyhydric alcohols and polyfunctional amines, with active hydroxyl compounds, e.g., polycarboxylic acids, or with polycarboxylic acid anhydrides. These resins are useful, for example, in coating formulations and are advantageous in that tack-free films can be formed and cured rapidly by heating. Amino hydrogen containing resins of our invention are non-volatile and are free of objectionable odors. They are capable of reacting with epoxides and polyepoxides in forming valubale resins.

The curable compositions of this invention can be prepared by mixing bis(2,3-epoxycyclopentyl) ether and a polyfunctional amine in liquid form at room temperature or higher temperatures. By the term "polyfunctional amine," as used herein, is meant an amine having at least two active amino hydrogen atoms which can be on the same nitrogen or on different nitrogen atoms. Bis(2,3-epoxycyclopentyl) ether can be maintained as a liquid at room temperatures without the use of solvents or diluents. There is little, or no necessity for heating to high temperatures or for the use of solvents or reactive diluents in order to obtain a homogeneous mixture of the amine and diepoxide, although such measures can be employed, if desired. These mixtures can be kept for long periods, up to a week and longer, at room temperatures with substantially no increase in viscosity, thus making such mixtures particularly suited for applications wherein a long pot-life is desired.

Our resinous compositions can be prepared from these curable compositions by the application of heat. The curing can be carried out by maintaining the curable compositions at temperatures from 30° C. to 250° C. Temperatures higher than 250° C. can be used although some discoloration which may not be desired may be brought about in the resinous compositions thus formed. The time for effecting the complete cure can be made to vary from a few minutes to several hours depending upon the selection of curing temperature. A high curing temperature will provide a resinous composition in less time than a low curing temperature. It is preferred, however, to heat the composition at a temperature within the range from 50° C. to 150° C. to first partially cure the composition. A temperature from 100° C. to 200° C. then can be used to complete the cure. However, any one or combination of two or more temperatures within the above-specified range of 30° C. to 250° C. can be employed if desired to effect the complete cure.

While not wishing to be held to any particular theory or mechanics of reaction, it is believed that in curing one epoxy group of a bis(2,3-epoxycyclopentyl) ether molecule reacts with a maximum of one amino hydrogen of a polyfunctional amine molecule with the formation of a hydroxyl group attached to the ether molecule and a carbon to nitrogen to carbon linkage connecting the ether and amine molecules. Thus, a polyfunctional amine having more than 2 amino hydrogens to the molecule would cross-link through carbon to nitrogen to carbon linkages, as is believed to occur. Also, according to our observations a degree of etherification occurs from intermolecular reactions of two or more epoxy groups with each other and from intermolecular reactions of an epoxy group with a hydroxyl group formed in the above noted-manner by a previous reaction of an epoxy group with an amino hydrogen. Thus, additional cross-linking through carbon to oxygen to carbon linkages is thought to be effected by these intermolecular reactions between epoxy groups or epoxy groups and hydroxyl groups.

Solid resins are obtained by curing mixtures of polyfunctional amines and bis(2,3-epoxycyclopentyl) ether. These solid resins can be made from mixtures of polyfunctional amines and bis(2,3-epoxycyclopentyl) ether in such relative proportions, for example, as provide from about 0.3 to 4 amino hydrogens of amine for each epoxy group of the ether. Solid resins that are particularly valuable from the standpoint of their outstanding properties of hardness, toughness, infusibility, high heat distortion values and insolubility in most organic solvents can be produced in accordance with our teachings. Illustratively, such particularly valuable resins can be produced by curing mixtures of polyfunctional amines and bis- (2,3-epoxycyclopentyl) ether in relative proportions providing from 0.4 to 2 amino hydrogens of the amine for each epoxy group of the ether. Anion exchange resins can be produced from mixtures of polyfunctional amines and bis(2,3-epoxycyclopentyl) ether in relative proportions providing, for example, from about 1 to 3 amino hydrogens of the amine for each epoxy group of the ether.

Our solid resins are useful in producing a large variety of molded or cast articles of manufacture. Thus, our curable compositions can be cast or molded in many different sizes and shapes to form such articles as buttons, combs, brush handles, children's toys, structural parts for instrument and radio cabinets and the like. By partially curing solid resin producing compositions to form a gel a heat hardenable composition can be obtained. This heat hardenable composition then can be granulated or reduced to powder form and used as a molding or casting composition, with, or without the addition of other ingredients. Fillers, e.g., talc, wood flour, alpha cellulose and the like, and pigments, e.g., titanium dioxide, antimony oxide, zinc oxide, carbon black and the like may be incorporated with our compositions to produce colored opaque objects.

Those of our solid resins which have high heat distortion values are useful in industrial applications wherein load carrying capabilities at high temperatures in addition to hardness and toughness is required. Such applications include hot fluid carrying conduits, high temperature electrical insulation, e.g., in high-speed aircraft and guided missiles, tools, dies and molds used at high temperatures, and various laminates, molded articles, adhesives an surface coatings which are subject to high temperature uses.

Our solid resins are also useful as coatings and the like for providing durable surfaces to objects. Of particular note in this regard is the fluid nature of our curable compositions making them particularly well suited for easy application to surfaces by such conventional methods as brushing, spraying, spreading and the like. This application can be performed without a solvent although one may be employed if desired. Pigments may also be added to provide coloration to the coating or the composition may be applied without a pigment to give a coating of natural color or transparency.

A further use of these compositions is in the field of adhesives. These compositions, when cured, adhere tenaciously to many types of materials, e.g., wood, cloth, metal, glass, paper and the like. In this respect they are particularly useful in manufacturing laminates of the above materials.

Anion exchange resins also can be made according to our teachings herein. Solid resins having anion exchange properties can be produced from mixtures of polyfunctional amines and bis(2,3 - epoxycyclopentyl) ether. An outstanding feature of this use is that our compositions can be easily cast or molded into any shape to fit specific anion-exchange applications.

Liquid resins containing reactive groups can be made from our curable compositions. Illustratively, such liquid resins can be made by curing mixtures of polyfunctional amines and bis(2,3-epoxycyclopentyl) ether in such relative amounts as to provide, for example, less than about .3 or more than about 4 amino hydrogens of amine for each epoxy group of ether. More particularly, liquid resins containing reactive epoxy groups can be made by curing a composition containing, for example, less than .3 amino hydrogens for each epoxy group. Such epoxy group-containing liquid resins find particularly valuable uses in coating formulations wherein additional polyfunctional amine hardener or other active hydrogen compound, e.g., polyhydric phenols, polyhydric alcohols, or active hydroxyl compound, e.g., polycarboxylic acids, or polycarboxylic acid anhydride is added. Such coating formulations have the advantage of being capable of easy application as tack-free films and can be cured rapidly by heating. Other uses for our epoxy group-containing liquid resins are as plasticizers because of their low-volatility and as stabilizers for chlorine containing polymers. Polyvinyl chloride, polyvinylidene chloride and chlorinated rubbers have been found to discolor and deteriorate upon exposure to strong sunlight or the ravages of nature for prolonged periods. It has been discovered that our epoxy containing compositions tend to discourage such discoloration and deterioration. Again more particularly, liquid resins containing reactive amino hydrogens can be produced by curing our amine-epoxide mixtures which contain, for example, more than 4 amino hydrogens for each epoxy group. Liquid resins containing reactive amino hydrogens have the particular properties of being of nonvolatile nature and free from objectionable odors. They can be used in applications where an active hydrogen compound is needed, for example, in hardening polymerizable epoxide compositions such as the reaction products of polyhydric phenols and epichlorhydrin.

Our resinous compositions can be regarded as mixtures of polymeric molecules characterized by the presence therein of interconnected units comprising polyvalent polyfunctional amine residues and tetravalent dicyclopentyl ether groups having hydrocarbon cyclopentane rings joined in pairs through carbon to oxygen to carbon linkages. Each of the rings have one valence on the 2-position carbon atom and one valence on the 3-position carbon atom, one valence of a given cyclopentane ring being attached to an amino nitrogen atom of one of said polyvalent polyfunctional amine residues, a carbon to nitrogen to carbon linkage thereby interconnecting the polyvalent polyfunctional amine residues and the tetravalent dicyclopentyl ether group, and not more than one other valence of a given cyclopentane ring being attached to a hydroxyl group. By the term, "polyvalent polyfunctional amine residue," as used herein, is meant a polyvalent group which can be regarded as the residue of a polyfunctional amine molecule which is lacking at least two amino hydrogens. By the terms "2-position carbon atom" and "3-position carbon atom," as used herein, is meant, respectively, the second and third carbon atoms in a given cyclopentane ring consecutively numbering around the ring starting with a first carbon atom which is that carbon atom forming one end of the carbon to oxygen to carbon linkage joining two of said rings into a tetravalent dicyclopentyl ether group as shown in the following graphic formula:

$$\begin{array}{c} \overset{}{H}C\underset{|2\ \ 1|}{\text{———}}CH\text{—}O\text{—}HC\underset{|1\ \ 2|}{\text{———}}C\overset{}{H} \\ HC3\ \ \ _5CH_3\ \ \ \ \ H_2C5\ \ \ _3CH \\ \diagdown_4\diagup\ \ \ \ \ \ \ \ \ \ \ \ \diagdown_4\diagup \\ CH_2\ \ \ \ \ \ \ \ \ \ \ \ \ \ \ \ CH_2 \end{array}$$

The polymeric molecules of our resinous compositions are closs-linked, linear or cyclic in nature and can be terminated by one or more monovalent organic groups or, in the case of cyclic molecules, need not be terminated. As terminal groups for our polymeric molecules, monovalent groups from the class of 2,3-epoxycyclopentyloxy-2-hydroxycyclopentyl group, 2,3-epoxycyclopentyloxy-3-hydroxycyclopentyl group, and monovalent polyfunctional amine residues are preferred. By the term "monovalent polyfunctional amine residues," as used herein, is meant monovalent groups which can be regarded as the residue of a polyfunctional amine molecule which is lacking one amino hydrogen.

Bis(2,3-epoxycyclopentyl) ether is a liquid diepoxy dicyclic aliphatic ether having a viscosity of about 28 centipoises at 27° C. The preparation of this diepoxide involves what can be termed epoxidation, or the controlled oxidation of the double bonds of bis(2-cyclopentenyl) ether which, isself, can be made from cyclopentadiene by the successive steps of hydrochlorination and alkaline hydrolysis. More specifically, bis(2-cyclopentenyl) ether can be prepared from the reaction of cyclopentadiene with hydrogen chloride in a suitable solvent, e.g., benzene, or without a solvent, for a period of about one hour at a low temperature, such as 0° C. to −15° C., thereby forming 1-chloro-2-cyclopentene. Subsequently, 1-chloro-2-cyclopentene can be subjected to alkaline hydrolysis with an aqueous solution of sodium carbonate or sodium hydroxide at a temperature of the order of 40° C. to 60° C. to form bis(2-cyclopentenyl) ether. A substantially pure bis(2-cyclopentenyl) ether then can be obtained by any suitable separation procedure, for example, fractional distillation.

Suitable epoxidizing agents for the epoxidation reaction include peracetic acid and acetaldehyde monoperacetate. The epoxidation reaction can be advantageously carried out by charging bis(2-cyclopentenyl) ether to a reaction vessel and then gradually adding the epoxidizing agent. In order to provide ease of handling and to avoid the formation of highly concentrated or crystalline peracetic acid with its attendant explosion hazard, the epoxidizing agent preferably is employed as a solution in a suitable solvent, as for example, acetone, chloroform, methylethyl ketone, ethyl acetate, butyl acetate, and the like. The reaction can be carried out at a temperature within the range of about −25° C. to 150° C., although lower and higher temperatures may be used. However, longer reaction times are needed at the lower temperatures to produce high yields. At the higher temperatures, side reactions form undesirable materials which can be removed, however, by suitable purification procedures, such as, fractional distillation. The reaction is continued until an analysis for epoxidizing agent indicates that an amount at least sufficient to epoxidize all the double bonds of the bis(2-cyclopentenyl) ether has been consumed. In this connection it is desirable to employ an excess over the theoretical amount of peracetic acid to assure complete epoxidation. Upon discontinuance of the reaction, by-products, solvent and unreacted material are removed by any convenient procedure, such as, by adding a potboiler, e.g., ethylbenzene, and stripping low-boiling materials. A liquid material, identified as bis(2,3-epoxycyclopentyl) ether, is obtained. This product partially solidifies on standing at room temperature for 1 to 3 days which indicates the possible formation of a solid position isomer. This semi-solid bis(2,3-epoxycyclopentyl) ether can be liquefied by melting at a temperature of 30° C. to 35° C. and will remain a liquid for a period of several days at room temperature.

Polyfunctional amines are typified by the aliphatic primary amines, such as, ethylamine, isopropylamine, n-butylamine, isobutylamine, 2-ethylhexylamine, monoethanolamine, monoisopropanolamine, beta alanine, amides, e.g., formamide, acetamide, propionamide, n-butyroamide, stearamides, hexahydrobenzamide, and the like; aromatic primary amines, such as, aniline, para-methylbenzylamine, and the like; heterocyclic primary amines, such as, N-(aminoethyl) morpholine, N-(aminopropyl) morpholine, and the like, the aliphatic poly-amines, such as, ethylenediamine, propylenediamines, butylenediamines, pentylenediamines, hexylenediamines, octylenediamines, nonylenediamines, decylenediamines, dimethylurea, 1,3-diamino-2-propanol, 3,3'-iminobispropylamine, guanidine and the like; aromatic polyamines, such as meta-, ortho-, and para-phenylenediamines, 1,4-naphthalenediamine, 1,4-anthradiamine, 3,3'-biphenyldiamine, 3,4-biphenyldiamine, 3,4-toluenediamine, meta-xylylenediamine, alpha, alpha'-bi-paratoluidine, para, para'-methylenedianiline, 1-methoxy-6-methylmeta-phenylenediamine, para, para'-sulfonyldiamine and the like; and heterocyclic polyamines, such as piperazine, 2,5-dimethylpiperazine, melamine, 2,4-diamine-5-(aminomethyl) pyrimidine, 2,4,6-triaminopyrimidine, 3,9-bis(aminoethyl) spirobi-metadioxane, the polyalkylene polyamines, in particular, the polyethylene polyamines and polypropylene polyamines, such as diethylenetriamine, triethylenetetramine, tetraethylenepentamine, dipropylenetriamine, and the like.

Other polyfunctional amines include the low molecular weight polyamides which are condensation products of polycarboxylic acids, in particular, hydrocarbon dicarboxylic acids, with polyamines, particularly, diamines, such as those monomeric diamines previously listed. Typical polyamides can be prepared in accordance with known condensation procedures from adipic acid and hexamethylenediamine, dilinoleic acid and ethylenediamine, terephthalic acid and diethylenetriamine and the like.

Still other illustrations of polyfunctional amines are the addition products of polyamines, in particular diamines, and triamines, and low molecular weight epoxides containing oxirane oxygen linked to vicinal carbon atoms, such as, ethylene oxide, propylene oxide, butadiene dioxide, diglycidyl ether, epoxidized soybean oil, epoxidized safflower oil, and the like, and polyglycidyl polyethers, such as those prepared from polyhydric phenols and epichlorhydrin. Particularly useful polyfunctional amines are the mono- and poly-hydroxyalkyl polyalkylene polyamines which can be prepared by the addition reaction of polyalkylene polyamines, preferably, ethylenediamine, propylenediamine, diethylenetriamine, dipropylenetriamine or triethylenetetramine and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include N-hydroxyethylethylenediamine, N,N'-bis(hydroxyethyl)ethylenediamine, N-bis(hydroxyethyl)diethylenetriamine, N,N-bis(hydroxyethyl)diethylenetriamine, N,N''-bis(hydroxyethyl)diethylenetriamine, N-hydroxypropyldiethylenetriamine, N,N-bis(hydroxypropyl)diethylenetriamine, N,N''-bis(hydroxypropyl)diethylenetriamine, N-hydroxyethylpropylenediamine, N-hydroxypropylpropylenediamine, N-hydroxyethyldipropylenetriamine, N,N-bis(hydroxyethyl)dipropylenetriamine, N,N'-bis(hydroxyethyl)dipropylenetriamine, tris(hydroxyethyl)triethylenetetramine and the like. Other polyfunctional amines can be prepared with known procedures by the addition reaction of polyglycidyl polyethers of dihydric phenols and polyamines, in particular, polyalkylene polyamines. Of particular importance in forming these epoxide polyamine adducts are the diglycidyl diethers of dihydric phenols, such as for example, the homologues of dihydroxydiphenylmethanes singularly or mixed and the dihydroxydiphenyldimethylmethanes singularly or mixed. Mixtures of diglycidyl diethers of dihydric phenols can be prepared by reacting epichlorhydrin with a dihydric phenol using a molar excess of epichlorhydrin over the theoretical molar requirement. Substantially pure cuts of the diglycidyl diethers then can be obtained by fractional distillation under reduced pressure, for example. Illustratively, the polyfunctional amine, i.e., the epoxide polyamine adduct, itself can be prepared by mixing the diglycidyl polyether of a dihydric phenol with a polyalkylene diamine such as diethylenetriamine, dipropylenetriamine, and the like, bringing to an elevated temperature, for example, up to about 200° C. and maintaining at such an elevated temperature for a period of from 4 to 5 hours. Alternatively, as an illustration, polyfunctional amines can be prepared by adding a diglycidyl diether of a dihydric phenol to a polyalkylene polyamine over a period of time, around three to four hours, while maintaining the reaction mixture at an elevated temperature, for example, up to about 200° C. and subsequently adding a dihydric phenol.

Additional polyfunctional amines include the low molecular weight addition products of a polyamine, preferably a polyalkylene polyamine such as those listed above, and a vinyl group-containing compound. Typical vinyl group-containing compounds are ethylene, propylene, 1-butene, isobutene, acrolein, vinyl chloride, vinyl acetate, acrylonitrile, styrene and the like. These polyfunctional amines can be prepared in accordance with known procedures by reacting a polyamine and a vinyl group-containing compound in various proportions at a temperature in the range from 20° C. to 100° C. and removing unreacted materials and low boiling materials by vacuum distillation.

Other polyfunctional amines having a total of at least two active amino hydrogen atoms to the molecule can be advantageously employed in the epoxide compositions of this invention. For example, such polyfunctional amines as mixtures of para,para'-methylenedianiline and meta-phenylenedianiline, or other mixtures of two or more polyfunctional amines, can be used. Particularly valuable compositions made in accordance with this invention are obtainable from bis 2,3-epoxycyclopentyl) ether and such polyfunctional amines as described above which have melting points or melting point ranges below about 150° C.

The following illustrative examples are presented. Wherever appearing in these examples, heat distortion values were obtained at 264 pounds per square inch of stress in accordance with ASTM test method D-648-45T. Barcol hardness values presented in the examples were determined through the use of a Barcol Impressor GYZJ 934-1 at a temperature of 25° C. unless otherwise indicated. Izod impact values as presented in the examples were obtained in accordance with ASTM test method, D-256-47T at a temperature of 25° C. unless otherwise indicated. Rockwell hardness values, flexural strengths, compressive strengths, tensile strengths and compressive yields given in the examples were all determined in accordance with ASTM test procedures at a temperature of about 25° C. unless otherwise indicated.

EXAMPLE 1

A mixture of 0.29 gram of 1,6-hexanediamine and 0.92 gram of bis(2,3-epoxycyclopentyl) ether was prepared and calculated as containing one amino hydrogen atom for each epoxy group. The mixture was maintained at 120° C. and after 67 minutes formed a gel. The gel was heated to 160° C. for 3 hours and converted into a transparent, amber resin having a Barcol hardness of 35. This resin was infusible.

EXAMPLE 2

A mixture was prepared from 0.43 gram of 1,6-hexanediamine and 0.92 gram of bis(2,3-epoxycyclopentyl) ether. The proportions of 1,6-hexanediamine and bis(2,3-epoxycyclopentyl) ether were calculated as containing 1.5 amino hydrogen atoms for each epoxy group. The mixture was placed in a mold and heated at a temperature of 120° C. for about 18 minutes during which time a gel formed. The gel was heated for 3 hours at a temperature of about 160° C. A transparent resin having a Barcol hardness of 30 was formed. This resin was infusible.

EXAMPLE 3

A mixture was prepared from 0.27 gram of para-phenylenediamine and 0.92 gram of bis(2,3-epoxycyclopentyl) ether and placed in a mold for curing. This mixture contained proportions of para-phenylenediamine and bis(2,3-epoxycyclopentyl) ether which were calculated as containing 1 amino hydrogen atom for each epoxy group. The mixture was heated at a temperature of about 120° C. and a gel formed within 27 minutes of heating at this temperature. The gel was heated for three hours at a temperature of about 160° C. and by the end of this time had converted to a resin having a Barcol hardness of 48. This resin was infusible.

EXAMPLE 4

A mixture of 6 moles of epichlorhydrin and 1 mole of 4,4'-dihydroxydiphenyldimethylmethane was heated in the presence of a small quantity of water. Sodium hydroxide (2.04 moles) was added in installments and heat was discontinued as the temperature reached about 80° C. and cooling was started to maintain the temperature below 100° C. After the exotherm had subsided and all the sodium hydroxide had been added, excess epichlorhydrin and the water were removed by vacuum distillation. The residue was cooled after the addition of 50-ml. of benzene and the salt was removed by filtration. After removing the benzene by vacuum distillation, the resulting polyglycidyl polyether had an average molecular weight of 380 and an epoxide equivalent, i.e., grams of polyether per epoxy group, of 190 as calculated by a standard epoxy analysis using pyridine hydrochloride reagent.

EXAMPLE 5

The polyglycidyl polyether such as that obtained in Example 4, and diethylenetriamine were mixed in the proportions of 1.0 mole of polyether and 6.0 moles of triamine. The reaction mixture then was heated to a temperature of 100° C. and then was maintained at that temperature for a period of 2 hours. After this period, two moles of excess diethylenetriamine were removed by vacuum distillation maintaining the kettle at 100° C. At the end of this operation 795 grams of a liquid residue representing an epoxide-polyamine adduct having a viscosity of 9000 centipoises was obtained. This epoxide-polyamine adduct analyzed as containing 52 percent by weight of reacted diethylenetriamine by determination of amino groups utilizing a perchloric acid titration to methyl violet endpoint in glacial acetic acid.

EXAMPLE 6

A mixture of 35 percent by weight of the epoxide-polyamine adduct as prepared in Example 5 and 65 percent by weight of bis(2,3-epoxycyclophenyl) ether was prepared. The ratio of active amino hydrogen atoms per epoxy group in this mixture was calculated as about 0.94. This mixture was brought to and maintained at the following temperatures; first, a temperature of about 50° C. for 4 hours, then, a temperature of 75° C. for 2 more hours and, finally, a temperature of about 90° C. for an additional 1.5 hours. During this time a gel was formed. This gel was then heated successively at 100° C. for 2 hours and at 160° C. for 2 hours. After this heat treatment a resin was obtained and was found to have a Barcol hardness of 44 and a heat distortion point of 159° C. at 264 pounds per square inch. This resin was infusible.

EXAMPLES 7 THROUGH 19

Thirteen mixtures, each containing bis(2,3-epoxycyclopentyl) ether and diethylenetriamine in the respective amounts in grams shown in columns I and II of Table I were prepared. The ratio of the number of active amino hydrogen atoms per epoxy group of each mixture are correspondingly listed in column III of Table I. Each mixture was maintained at a temperature of 120° C. for the periods of time listed in column IV of Table I and then at a temperature of 160° C. for from 4 to 6 hours. After maintaining the mixtures of Examples 10 through 17 at a temperature of about 120° C. for the time specified in column IV, gels formed in each case. After maintaining the mixtures of Examples 7, 8 and 9 at 120° C. for, respectively, 8, 2 and 2.25 hours gels formed, in each case. The mixtures of Examples 18 and 19 formed solid resins after heating for 50 hours at a temperature of about 120° C. and 4 hours at 160° C. Solid resins having Barcol hardness values correspondingly listed in column V were obtained from all thirteen mixtures. The resins of Examples 8 through 15 were tough and infusible, in addition to being exceptionally hard.

Table I

| Example Number | I<br>Grams of Bis (2,3-epoxycyclopentyl) Ether | II<br>Grams of Diethylenetriamine | III<br>Ratio of Active Amino Hydrogen Atoms Per Epoxy Group | IV<br>Cure Time in Hours at 120° C. | V<br>Barcol Hardness |
|---|---|---|---|---|---|
| 7 | 0.91 | 0.065 | 0.30 | 24 | |
| 8 | 1.82 | 0.152 | 0.35 | 7 | 39 |
| 9 | 0.91 | 0.086 | 0.40 | 7 | 39 |
| 10 | 1.86 | 0.30 | 0.71 | 3 | 35 |
| 11 | 0.93 | 0.21 | 1.00 | 0.60 | 44 |
| 12 | 0.93 | 0.26 | 1.24 | 0.55 | 40 |
| 13 | 0.93 | 0.32 | 1.52 | 0.50 | 40 |
| 14 | 0.93 | 0.37 | 1.76 | 0.45 | 35 |
| 15 | 0.93 | 0.42 | 2.00 | 0.30 | 20 |
| 16 | 0.93 | 0.53 | 2.52 | 0.30 | 8 |
| 17 | 0.93 | 0.63 | 3.00 | 0.57 | 0 |
| 18 | 0.91 | 0.76 | 3.50 | 50 | 0 |
| 19 | 0.91 | 0.86 | 4.00 | 50 | 0 |

The resins of Examples 7, 16 and 17 were softer but infusible.

EXAMPLES 20 THROUGH 33

Fourteen mixtures were prepared as follows. Bis (2,3-epoxycyclopentyl) ether and p,p'-methylenedianiline were mixed in various proportions as listed in Table II. The mixture thus obtained contained ratios of active amino hydrogen atoms per epoxy group as correspondingly listed in Table II below.

Table II

| Example Number | Bis(2,3-epoxycyclopentyl) Ether (Grams) | p,p'-Methylenedianiline (Grams) | Ratio of Active Amino Hydrogen Atoms Per Epoxy Group |
|---|---|---|---|
| 20 | 0.91 | 0.099 | 0.2 |
| 21 | 0.91 | 0.148 | 0.3 |
| 22 | 0.91 | 0.198 | 0.4 |
| 23 | 27.6 | 7.4 | 0.49 |
| 24 | 25.8 | 9.2 | 0.65 |
| 25 | 24.2 | 10.8 | 0.82 |
| 26 | 22.8 | 12.2 | 0.98 |
| 27 | 18.0 | 12.0 | 1.22 |
| 28 | 16.5 | 13.5 | 1.50 |
| 29 | 0.91 | 0.99 | 2.0 |
| 30 | 0.91 | 1.24 | 2.5 |
| 31 | 0.91 | 1.48 | 3.0 |
| 32 | 0.91 | 1.73 | 3.5 |
| 33 | 0.91 | 1.97 | 4.0 |

The mixtures thus obtained were warmed until homogeneous melts were formed. The melts of Examples 20, 21, 22 and 29 through 33 were maintained at a temperature of about 120° C. for 29.5 hours. Each melt of Examples 23 through 28 was formed into a casting by maintaining at a temperature of about 80° C. for 25 to 50 hours and then at a temperature of 160° C. for an additional 6 hours. Transparent, solid resins having the properties correspondingly listed in Table III below were obtained from the melts of Examples 21 through 33 whereas a viscous liquid resin was formed from the melt of Example 20. The resins of Examples 22 through 29 were tough and infusible in addition to the below listed properties. Determinations of heat distortion and Izod impact values at about 25° C. were not made for Examples 20 through 22 and Examples 29 through 33.

Table III

| Example Number | Barcol Hardness | Heat Distortion (° C.) | Izod Impact (foot-pounds/inch of notch) |
|---|---|---|---|
| 20 | | | |
| 21 | 0 | | |
| 22 | 0 | | |
| 23 | 45 | 110 | 0.1 |
| 24 | 50 | 158 | 0.1 |
| 25 | 49 | 177 | 0.3 |
| 26 | 43 | 181 | 0.4 |
| 27 | 44 | 182 | 0.4 |
| 28 | 34 | 184 | 1.0 |
| 29 | 33 | | |
| 30 | 0 | | |
| 31 | 0 | | |
| 32 | 0 | | |
| 33 | 0 | | |

Mixtures of bis(2,3-epoxycyclopentyl) ether and amines such as those described in the preceding examples have been kept for periods of one week and longer at room temperatures (about 25° C.) without any appreciable increase in viscosity.

EXAMPLE 34

A mixture of 1.82 grams of bis(2,3-epoxycyclopentyl) ether and 0.93 gram of aniline was prepared. This mixture contained proportions of aniline and diepoxide providing one active amino hydrogen atom per epoxy group. The mixture was brought to 120° C. and maintained at this temperature for about 26 hours. After this time, the temperature of the mixture was raised to 160° C. and held for 6 additional hours. There was obtained a transparent, dark brown resin.

EXAMPLE 35

A mixture of 1.82 grams of bis(2,3-epoxycyclopentyl) ether and 1.29 grams of 2-ethylhexylamine was prepared. This mixture contained proportions of amine and diepoxide providing one active amino hydrogen atom per epoxy group. The mixture was cured for 26 hours at a temperature of 120° C. and then for 6 hours at 160° C. There was obtained a transparent, dark brown resin.

EXAMPLE 36

A mixture of 482 grams of bis(2,3-epoxycyclopentyl) ether and 168 grams of a polyfunctional amine hardener which contained 60 weight percent of m-phenylenediamine and 40 weight percent of 4,4'-methylenedianiline was prepared. This mixture contained amounts of bis(2,3-epoxycyclopentyl) ether and amine hardener providing approximately one active amino hydrogen atom per epoxy group. The mixture was cured at 120° C. for 1.5 hours and then maintained successively at 160° C. and 200° C. for periods of 16 hours and 1 hour, respectively. A hard, tough resin having the following properties was obtained:

Heat distortion _____ °C__ 179
Rockwell hardness _____ M-120
Flexural strengths:
    Room temperature (about 25° C.)___p.s.i__ 22,900
    150° C. _____p.s.i__ 11,400
    175° C. _____p.s.i__ 9,100
Compressive strength _____p.s.i__ 46,200
Compressive yield _____p.s.i__ 28,100
Tensile strength _____p.s.i__ 8,500

The resin was infusible.

EXAMPLE 37

A homogeneous mixture of 0.91 gram of bis(2,3-epoxycyclopentyl) ether and 0.34 gram of meta-xylylenediamine was prepared at room temperature. The mixture contained proportions of amine and diepoxide providing one active amino hydrogen atom per epoxy group. The temperature of the mixture was raised to about 120° C. and held there for about 6⅓ hours during the first 30 minutes of which time a gel was formed. The temperature of the gel then was raised to about 160° C. and held there for about 6 hours. A tough resin having a Barcol hardness of 46 was thus obtained. The resin was infusible.

EXAMPLE 38

A mixture was prepared from 0.91 gram of bis(2,3-epoxycyclopentyl) ether and 1.82 grams of a polyamide known as Versamid 115, which is a commercially available polyamide having an amine number of 220 which represents the number of milligrams of KOH equivalent to 1 gram of polyamide and a viscosity of 625 poises at 40° C. The amounts of bis(2,3-epoxycyclopentyl) ether and polyamide contained by this mixture were such as to provide 0.715 active amino hydrogen atom per epoxy group. The mixture was brought to a temperature of 120° C. and maintained there until a gel formed, requiring about 25 minutes. The gel was maintained at 120° C. for an additional 2 hours and 15 minutes and then was brought to and held at a temperature of 160° C. for 6 hours. An amber, tough, flexible resin was thus obtained.

Our curable compositions can also contain other polyfunctional compounds which are reactive with epoxy groups. For example, polyols or compounds containing more than one aliphatic or phenolic hydroxyl group can be added to our curable compositions and valuable resins can be formed therefrom. Other polyfunctional compounds which can be added are polycarboxylic anhydrides. Also other polyepoxides can be added to our curable compositions which then can be cured to provide useful resins.

What is claimed is:

1. A composition which is curable to a solid resin, said composition comprising bis(2,3-epoxycyclopentyl) ether and a polyfunctional amine in proportions containing from 0.3 to 4.0 amino hydrogen atoms of the amine for each epoxy group of bis(2,3-epoxycyclopentyl) ether.

2. A composition which is curable to a solid resin, said composition comprising bis(2,3-epoxycyclopentyl) ether and 1,6-hexanediamine in proportions containing from 0.3 to 4.0 amino hydrogen atoms of the amine for each epoxy group of bis(2,3-epoxycyclopentyl) ether.

3. A composition which is curable to a hard, tough resin, said composition comprising bis(2,3-epoxycyclopentyl) ether and 1,6-hexanediamine in proportions containing from 0.4 to 2.0 amino hydrogen atoms of the amine for each epoxy group of bis(2,3-epoxycyclopentyl) ether.

4. A composition which is curable to a solid resin, said composition comprising bis(2,3-epoxycyclopentyl) ether and phenylenediamine in proportions containing from 0.3 to 4.0 amino hydrogen atoms of the amine for each epoxy group of bis(2,3-epoxycyclopentyl) ether.

5. A composition which is curable to a hard, tough resin, said composition comprising bis(2,3-epoxycyclopentyl) ether and phenylenediamine in proportions containing from 0.4 to 2.0 amino hydrogen atoms of the amine for each epoxy group of bis(2,3-epoxycyclopentyl) ether.

6. A composition which is curable to a solid resin, said composition comprising bis(2,3-epoxycyclopentyl) ether and diethylenetriamine in proportions containing from 0.3 to 4.0 amino hydrogen atoms of the amine for each epoxy group of bis(2,3-epoxycyclopentyl) ether.

7. A composition which is curable to a hard, tough resin, said composition comprising bis(2,3-epoxycyclopentyl) ether and diethylenetriamine in proportions containing from 0.4 to 2.0 amino hydrogen atoms of the amine for each epoxy group of bis(2,3-epoxycyclopentyl) ether.

8. A composition which is curable to a solid resin, said composition comprising bis(2,3-epoxycyclopentyl) ether and p,p'-methylenedianiline in proportions containing from 0.3 to 4.0 amino hydrogen atoms of the amine for each epoxy group of bis(2,3-epoxycyclopentyl) ether.

9. A composition which is curable to a hard, tough resin, said composition comprising bis(2,3-epoxycyclopentyl) ether and p,p'-methylenedianiline in proportions containing from 0.4 to 2.0 amino hydrogen atoms of the amine for each epoxy group of bis(2,3-epoxycyclopentyl) ether.

10. A composition which is curable to a solid resin, said composition comprising bis(2,3-epoxycyclopentyl) ether and meta-xylylenediamine in proportions containing from 0.3 to 4.0 amino hydrogen atoms of the amine for each epoxy group of bis(2,3-epoxycyclopentyl) ether.

11. A composition which is curable to a hard, tough resin, said composition comprising bis(2,3-epoxycyclopentyl) ether and meta-xylylenediamine in proportions containing from 0.4 to 2.0 amino hydrogen atoms of the amine for each epoxy group of bis(2,3-epoxycyclopentyl) ether.

12. A composition which is curable to a solid resin, said composition comprising bis(2,3-epoxycyclopentyl) ether and 2-ethylhexylamine in proportions containing from 0.3 to 4.0 amino hydrogen atoms of the amine for each epoxy group of bis(2,3-epoxycyclopentyl) ether.

13. A composition which is curable to a hard, tough resin, said composition comprising bis(2,3-epoxycyclopentyl) ether and 2-ethylhexylamine in proportions containing from 0.4 to 2.0 amino hydrogen atoms of the amine for each epoxy group of bis(2,3-epoxycyclopentyl) ether.

14. The resin obtained by heating the composition of claim 1.

15. The resin obtained by heating the composition of claim 2.

16. The resin obtained by heating the composition of claim 3.

17. The resin obtained by heating the composition of claim 4.

18. The resin obtained by heating the composition of claim 5.

19. The resin obtained by heating the composition of claim 6.

20. The resin obtained by heating the composition of claim 7.

21. The resin obtained by heating the composition of claim 8.

22. The resin obtained by heating the composition of claim 9.

23. The resin obtained by heating the composition of claim 10.

24. The resin obtained by heating the composition of claim 11.

25. The resin obtained by heating the composition of claim 12.

26. The resin obtained by heating the composition of claim 13.

References Cited in the file of this patent

UNITED STATES PATENTS 2,739,161    Carlson _____ Mar. 20, 1956

FOREIGN PATENTS 133,819    Australia _____ July 15, 1946